Figure 3:
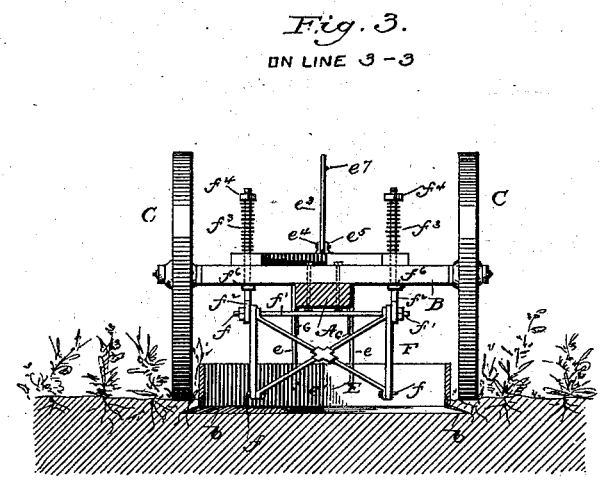

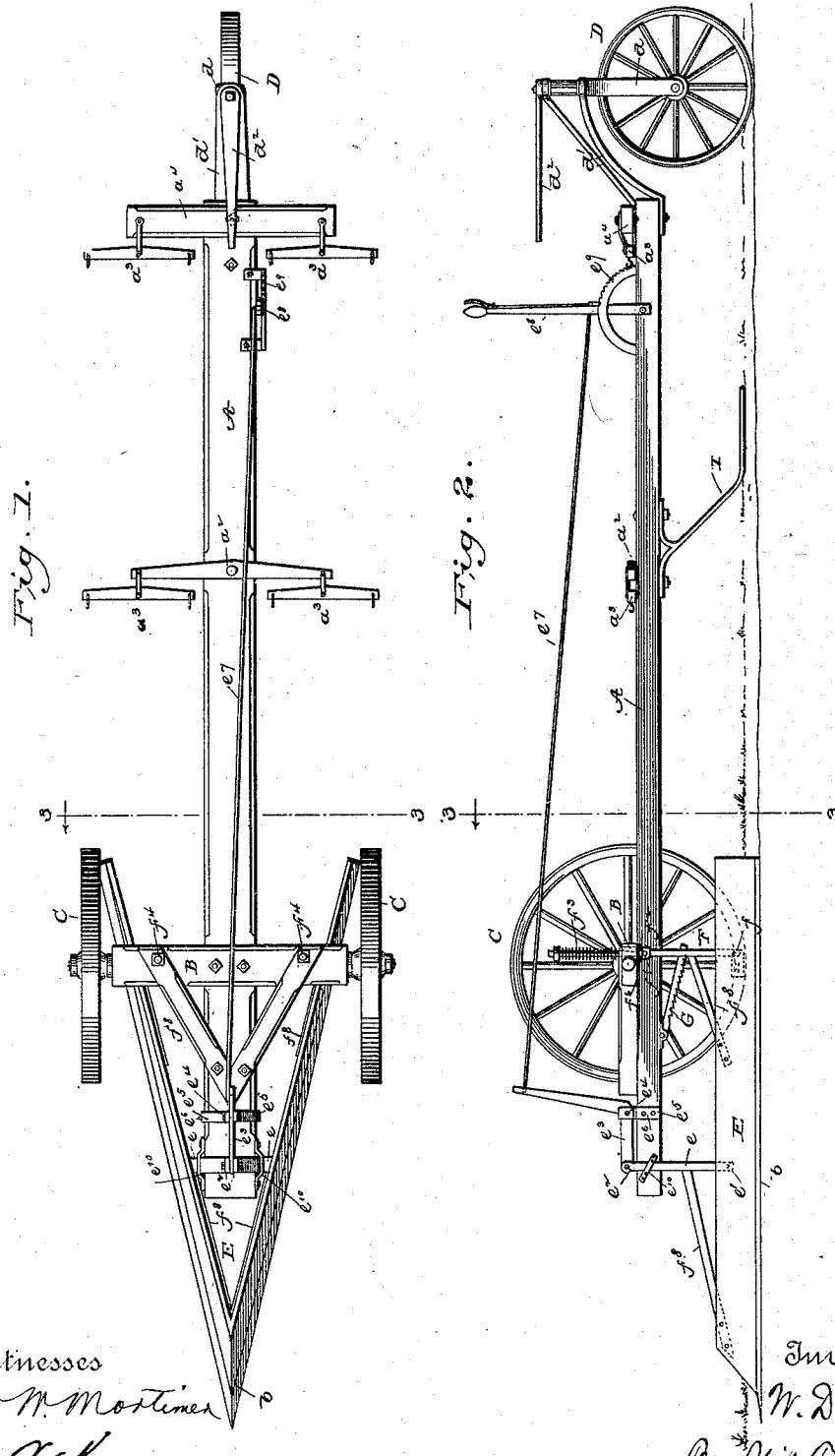

(No Model.) 2 Sheets—Sheet 2.

W. D. ARNETT.
MACHINE FOR DESTROYING SAGE BRUSH.

No. 416,661. Patented Dec. 3, 1889.

ON LINE 3-3

Witnesses

Inventor
W. D. Arnett
By Phil. T. Dodge
Attorney

UNITED STATES PATENT OFFICE.

WILLIAM D. ARNETT, OF CALDWELL, IDAHO TERRITORY.

MACHINE FOR DESTROYING SAGE-BRUSH.

SPECIFICATION forming part of Letters Patent No. 416,661, dated December 3, 1889.

Application filed April 9, 1889. Serial No. 306,530. (No model.)

*To all whom it may concern:*

Be it known that I, WILLIAM D. ARNETT, of Caldwell, in the county of Ida and Territory of Idaho, have invented certain Improvements in Machines for Destroying Sage-Brush, of which the following is a specification.

The aim of my invention is to produce a machine for removing and destroying sage-brush; and to this end it consists in a wheel-frame provided with a triangular frame adjustably connected therewith and provided with rigid cutting-blades and means for propelling, guiding, and adjusting the cutter, as hereinafter explained.

In the accompanying drawings, Figure 1 is a top plan view of my machine. Fig. 2 is a side elevation of the same, one of the main wheels being removed to expose other parts to view. Fig. 3 is a cross-section on the line 3 3 of the preceding figure.

Referring to the drawings, A represents a strong horizontal timber or frame sustained near its forward end by a transverse axle B, which is bolted rigidly thereto and sustained by the ground-wheels C C. The rear end of the frame is supported by a swiveling steering-wheel D, mounted in the lower end of a forked post $d$, the upper end of which is formed with a vertical journal mounted in arms $d'$, fixed rigidly to the frame. An arm or tiller $d^2$, fixed to the upper end of the wheel-post, enables the operator to control the wheel to deflect the rear end of the frame to the right or left as the machine advances.

For the purpose of propelling the machine two doubletrees $a^2$ and $a^4$ are pivoted upon and across the frame and provided at their ends with singletrees $a^3$. This arrangement permits the employment of four draft-animals near the rear end of the frame, two on each side.

Under the forward end of the frame I suspend the frame E, of A-form when viewed from above. This frame, which may be constructed of any suitable material, provided it is adapted to withstand the severe strains to which it is subjected, is provided along each side at the lower edge with a blade or cutter $b$, fixed rigidly thereto, projecting outward and slightly downward, as shown in Fig. 3, whereby they are adapted to run upon or slightly below the surface of the ground for the purpose of severing the roots of the brush.

At the forward end the cutter-frame E is suspended by pendent links $e$, the lower ends of which are pivoted to the cutter at $e'$, while their upper ends are pivoted at $e^2$ to the forward end of an angular lever $e^3$. This lever is pivoted at $e^4$ to the upper ends of standards $e^5$, which are bolted at $e^6$ to the main frame A. A controlling bar or rod $e^7$ extends from the upper end of the lever $e^3$ rearward to a hand-lever $e^8$, which is pivoted to the main frame and provided with a suitable latch or dog to engage the stationary notched plate $e^9$. By means of the lever $e^8$ and the links $e^2$ the forward end of the cutter-frame may be raised or lowered and fixed at any desired height. The suspending-links $e$ pass through guides $e^{10}$, adapted, as shown, to permit the links to swing out of their vertical position, for a purpose which will presently appear.

The rear end of the cutter-frame is supported from the main frame by an intermediate coupling-frame F. (Shown in Figs. 2 and 3.) This coupling-frame, which may be constructed in any form and manner, provided it posseses the necessary rigidity, has its lower extremities connected to the cutter-frame by horizontal pivots $f$ and its upper end connected by a horizontal rod $f'$ to the lower ends of two eyebolts $f^2$. These eyebolts are extended upward loosely through holes in the main axle B, and are encircled at the upper ends by helical supporting-springs $f^3$, the upper ends of which act against nuts $f^4$ on the bolts. These springs, which serve to sustain and carry the cutter-frame, are intended to yield and permit the frame and wheels to rise independently when the wheels override obstructions, thus relieving the cutter and the intermediate connections of the severe and dangerous strains to which they would be subjected by reason of the brush holding them down. By adjusting the nuts $f^4$ the tension of the springs may be increased to any desired extent.

The height at which the rear end of the cutter-frame stands when in action is controlled by adjustable nuts $f^6$, applied to the eyebolts beneath the axle, as shown in Fig. 3.

It will be observed that the pivoted coupling frame F and the pivoted suspending-links e are so arranged as to admit of the cutter-frame being swung upward in a forward direction in order that it may be thrown out of action when the machine is to be transported from place to place. In order to sustain the frame when thus lifted, I provide a toothed latch G, which is pivoted to the frame and arranged to engage the coupling-frame F, as shown, or any suitable portion of the cutter-frame. When the cutter-frame is in operative position, the latch will prevent it from swinging rearward out of action. As an additional means of supporting the frame in operative position I propose to provide it, as shown, with rigid stop-arms $f^8$, arranged to abut against the pivoted sustaining-frames, as shown in Fig. 2.

In order to prevent the rear end of the frame from being lowered by depressions in the path of the rear wheel, I provide the frame with a strong runner I, bolted firmly thereto forward of the rear wheel, as shown in the drawings. This runner stands under ordinary circumstances slightly above the surface of the ground.

In operating my machine the draft-animals are attached on the two sides in rear of the cutter-frame. The operator stands upon the rear evener or doubletree $a^4$, astride of the tiller $d^2$, and in position to conveniently operate the hand-lever $e^8$. As the machine advances the knives or cutters at the lower edge of the frame E rapidly sever the roots of the brush and direct the latter to the right and left, thus leaving a clear or unobstructed path for the passage of the team. By means of the lever $e^8$ the forward end of the cutter and the depth of cut may be arranged as desired.

Having thus described my invention, what I claim is—

1. In a machine for destroying sage-brush, the wheel-sustaining frame and cutter-frame located at the forward end thereof, in combination with the runner I, located in rear of the said cutter-frame and adapted to support the rear end of the wheeled frame.

2. The combination of the wheeled frame A, the triangular cutter-frame E, located at the forward end thereof, the cutting-knives on the lower edge of said triangular frame and the runner I, located in rear of the frame E.

3. In a machine for destroying sage-brush, &c., the main frame provided with the front sustaining-wheels, the rear steering-wheel, and the rear draft devices, in combination with the triangular frame suspended from the forward end of the main frame and provided with fixed blades $b$ along its forward side.

4. In a machine for destroying sage-brush, a wheeled main frame, the secondary triangular frame provided with fixed blades $b$ along its forward sides, and spring suspension devices between said frames, whereby the main frame is permitted to rise and fall in traveling over irregular surfaces without causing the destruction of the blades.

5. The combination, with the wheel-sustaining frame A, of the vertically-adjustable cutter-frame E, its operating-lever located on the wheeled frame and connected to the forward end of the cutter-frame, and the suspending-frame F, pivoted to the wheeled frame and the cutter-frame and adapted to support the rear end thereof.

6. In a machine for destroying sage-brush, the combination of the rigid sustaining wheeled frame, the triangular cutter-frame E, pivotally connected thereto at its forward end, the suspending-frame F, having its lower end pivoted to the cutter-frame, the eyebolts $f^3$, connected to the upper end of the suspending-frame and extending therefrom upward through the wheeled frame, and the springs encircling said bolts above the said wheeled frame and tending to sustain the cutter-frame.

7. In a machine for destroying sage-brush, the frame A, the sustaining-wheels C at its forward end, the steering-wheel D at its rear end, and its tiller $d^2$, in combination with the cutter-frame E, pivotally connected to the forward end of the frame A, and its operating-lever, said lever extending to a point adjacent to the tiller-lever $d^2$, whereby the attendant is enabled to operate both levers from one point.

In testimony whereof I hereunto set my hand, this 9th day of January, 1889, in the presence of two attesting witnesses.

WILLIAM D. ARNETT.

Witnesses:
GEORGE W. PAUL,
AGNES A. PAUL.